United States Patent
Berge

(10) Patent No.: US 9,586,322 B2
(45) Date of Patent: Mar. 7, 2017

(54) METHOD AND DEVICE FOR TREATMENT OF A PIPESTRING SECTION THAT IS POSITIONED IN A SET-BACK

(75) Inventor: Roar Berge, Kristiansand S (NO)

(73) Assignee: NATIONAL OILWELL VARCO NORWAY AS, Kristiansand S (NO)

( * ) Notice: Subject to any disclaimer, the term of this patent is extended or adjusted under 35 U.S.C. 154(b) by 1057 days.

(21) Appl. No.: 13/638,119

(22) PCT Filed: Mar. 25, 2011

(86) PCT No.: PCT/NO2011/000103
§ 371 (c)(1),
(2), (4) Date: May 3, 2013

(87) PCT Pub. No.: WO2011/122954
PCT Pub. Date: Oct. 6, 2011

(65) Prior Publication Data
US 2013/0220367 A1 Aug. 29, 2013

(30) Foreign Application Priority Data

Mar. 30, 2010 (NO) .................................. 20100469

(51) Int. Cl.
*B08B 7/00* (2006.01)
*B25J 11/00* (2006.01)
(Continued)

(52) U.S. Cl.
CPC .......... *B25J 11/005* (2013.01); *B25J 11/0085* (2013.01); *E21B 17/006* (2013.01); *E21B 19/14* (2013.01); *F16L 58/182* (2013.01)

(58) Field of Classification Search
None
See application file for complete search history.

(56) References Cited

U.S. PATENT DOCUMENTS 3,971,442 A 7/1976 Scott
4,119,837 A * 10/1978 Sheldon ............... G05B 19/232
377/107
(Continued)

FOREIGN PATENT DOCUMENTS

EP 2273058 A2 1/2011
NO WO 2011122954 A1 * 10/2011 ........... E21B 17/006
(Continued)

OTHER PUBLICATIONS

Wroblaski, Debunking the Myths of Hydraulic to Electric Actuator Conversion, Sep. 22, 2007, Thomson, date stamp, abstract, paragraph begining with "This simple electrical actuator".*
(Continued)

*Primary Examiner* — Binh X Tran
*Assistant Examiner* — David Cathey, Jr.
(74) *Attorney, Agent, or Firm* — Conley Rose, P.C.

(57) ABSTRACT

A method for treating pipe string sections being in a set-back and being arranged in a vertical position comprises arranging a remote-controllable manipulator at least at one of the threaded portions of the pipe string sections. In addition, the method comprises providing the remote-controllable manipulator with a tool. The tool is arranged to at least clean or lubricate said threaded portion. Further, the method comprises moving the tool to a threaded portion which is to be treated and at least clean or lubricate the threaded portion.

10 Claims, 5 Drawing Sheets

(51) Int. Cl.
   *E21B 17/00* (2006.01)
   *E21B 19/14* (2006.01)
   *F16L 58/18* (2006.01)

(56) References Cited

U.S. PATENT DOCUMENTS

| | | | |
|---|---|---|---|
| 4,725,179 A | | 2/1988 | Woolslayer et al. |
| 6,032,441 A | * | 3/2000 | Gust .................... A01D 75/30 56/15.5 |
| 6,578,632 B2 | | 6/2003 | Mullins |
| 7,841,415 B2 | | 11/2010 | Winter |
| 7,857,044 B2 | * | 12/2010 | Grotherr ................. E21B 19/00 166/85.1 |
| 8,286,728 B2 | | 10/2012 | Veeningen |
| 2004/0221871 A1 | * | 11/2004 | Fletcher ............ H01L 21/67184 134/6 |
| 2005/0047884 A1 | | 3/2005 | Belik |
| 2010/0243325 A1 | | 9/2010 | Veeningen |
| 2011/0108264 A1 | | 5/2011 | Ge |
| 2013/0199845 A1 | | 8/2013 | Zaleski, Jr. et al. |

FOREIGN PATENT DOCUMENTS

| | | |
|---|---|---|
| WO | 9525216 A1 | 9/1995 |
| WO | 9960245 A1 | 11/1999 |
| WO | 0208564 A1 | 1/2002 |
| WO | 2006/065149 A1 | 6/2006 |

OTHER PUBLICATIONS

Massimino et al, A Multi-Mode Manipulator Display System for Controlling Remote Robotic Systems, 1993, American Institute of Aeronautics, AIAA-94-0888-CP, p. 339.*
WordReference, May 29, 2005, setback, WordReference, date stamp, setb back definition.*
Wyoming Oil and Gas Conservation Commision, Report to the Joint Minerals, Business and Economic Development Committee Well Setbacks Final Rule, May 28, 2015, First Two Paragraphs Chapter 1, First Paragraph Chapter 3.*
PCT/NO2011/000103 International Search Report and Written Opinion dated Jun. 24, 2011 (10 p.).
PCT/NO2011/000103 Reply to Written Opinion of Jun. 24, 2011; Reply Dated Oct. 10, 2011 (3 p.).

* cited by examiner

US 9,586,322 B2

METHOD AND DEVICE FOR TREATMENT OF A PIPESTRING SECTION THAT IS POSITIONED IN A SET-BACK

CROSS-REFERENCE TO RELATED APPLICATIONS

This application is a 35 U.S.C. §371 national stage application of PCT/NO2011/000103 filed Mar. 25, 2011, which claims the benefit of Norwegian Application No. 20100469 filed Mar. 30, 2010, both of which are incorporated herein by reference in their entireties for all purposes.

STATEMENT REGARDING FEDERALLY SPONSORED RESEARCH OR DEVELOPMENT

Not applicable.

BACKGROUND

Field of the Invention

This invention relates to a method for the treatment of a pipe string section that is in a set-back. More particularly, it relates to a method for the treatment of threaded portions of pipe string sections, wherein the several pipe string sections are placed in a set-back and the pipe string sections being arranged in a vertical position. The invention also includes a device for practising the invention.

Background of the Technology

When tripping a pipe string out of a borehole as it is known from the recovery of petroleum, for example, it is usual to perform a cleaning and lubrication of the threaded portions of the pipe string sections while they are at the drilling centre of a drilling device. In some cases, the treatment may also be performed in connection with screwing the pipe string sections together.

Such a cleaning and lubricating process lengthens the time spent on each disassembling operation, thereby contributing to lengthening a time-critical process.

Even though automated equipment which is arranged to perform the cleaning and lubricating operations has been developed, there is still some extra time being spent on this work during each disassembling operation.

The invention has for its object to remedy or reduce at least one of the drawbacks of the prior art. The object is achieved in accordance with the invention through the features which are specified in the description below and in the claims that follow.

BRIEF SUMMARY OF THE DISCLOSURE

A method is provided for treating pipe string sections, wherein several pipe string sections are in a set-back and wherein the pipe string sections are arranged in a vertical position, and the method is characterized by comprising: arranging a remote-controllable manipulator at least at one of the threaded portions of the pipe string sections; providing the remote-controllable manipulator with a tool, the tool being arranged to at least clean or lubricate said threaded portion; and moving the tool to a threaded portion which is to be treated and at least clean or lubricate the threaded portion.

The method may further comprise to position, by remote control, the tool at the threaded portion, the current position of the tool being shown on a display.

Since it may be complicated to keep track of where in the set-back pipe string sections are present, it has turned out to be the most appropriate to coarsely position the tool at the relevant threaded portion and then finely position the tool manually by remote control, the position of the tool being shown on a display, for example by means of a camera and a display screen.

By relatively simple means, the manipulator may, if desired, measure the length of the relevant pipe string section from a reference point. Such a measurement may be appropriate to calculate the length of the pipe string.

In a set-back for pipe string sections, in which the pipe string sections are in a vertical position and in which at least one threaded portion of the pipe string sections is accessible, a tool which is arranged to at least clean or lubricate the threaded portion is arranged, the tool being connected to a remote-controllable manipulator which is positionable at the threaded portion.

The set-back may be in a derrick in which the pipe string sections may be placed in so-called fingerboards, for example.

The manipulator may be connected to the structure of the derrick, on which, with advantage, it may be liftable and lowerable.

The manipulator may have a working range covering, in the main, the set-back and comprise at least one displaceable arm.

By means of an elevation guide, the tool may be displaceable in the longitudinal direction of the drill string section.

The manipulator may cooperate with a position indication system which is arranged to show the position of the tool on a display screen.

By arranging the positioning system for control from an operator console, for example, the operator may carry out the treatment of the threaded portions whenever suitable for the work situation. Thereby the cleaning and lubricating operation has been removed from the break-out or make-up operation itself, which provides for a considerable time gain.

BRIEF DESCRIPTION OF THE DRAWINGS

In what follows is described an example of a preferred method and embodiment which is visualized in the accompanying drawings, in which.

DETAILED DESCRIPTION OF THE PREFERRED EMBODIMENTS

Figure 1:
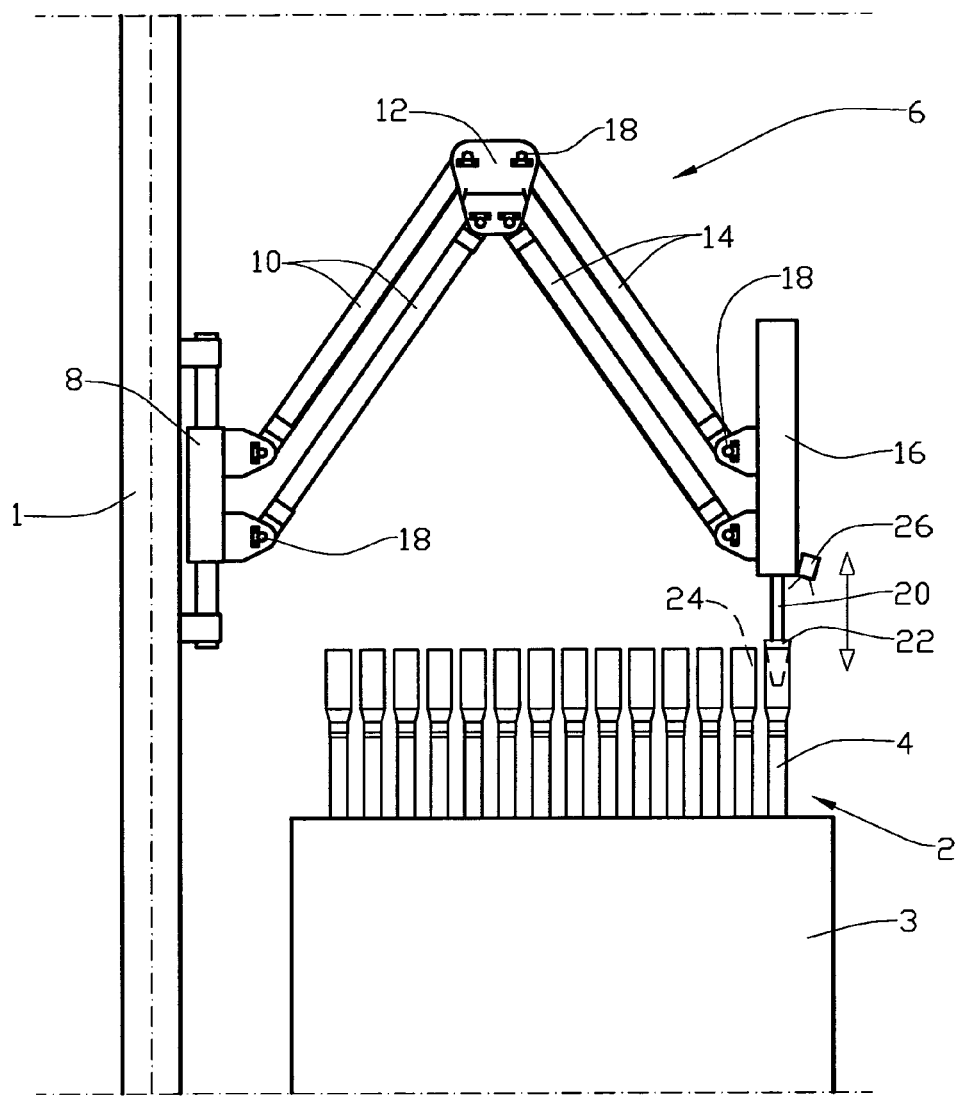
FIG. 1 shows a side view of a device according to the invention, the device being placed in a derrick.
Figure 2:
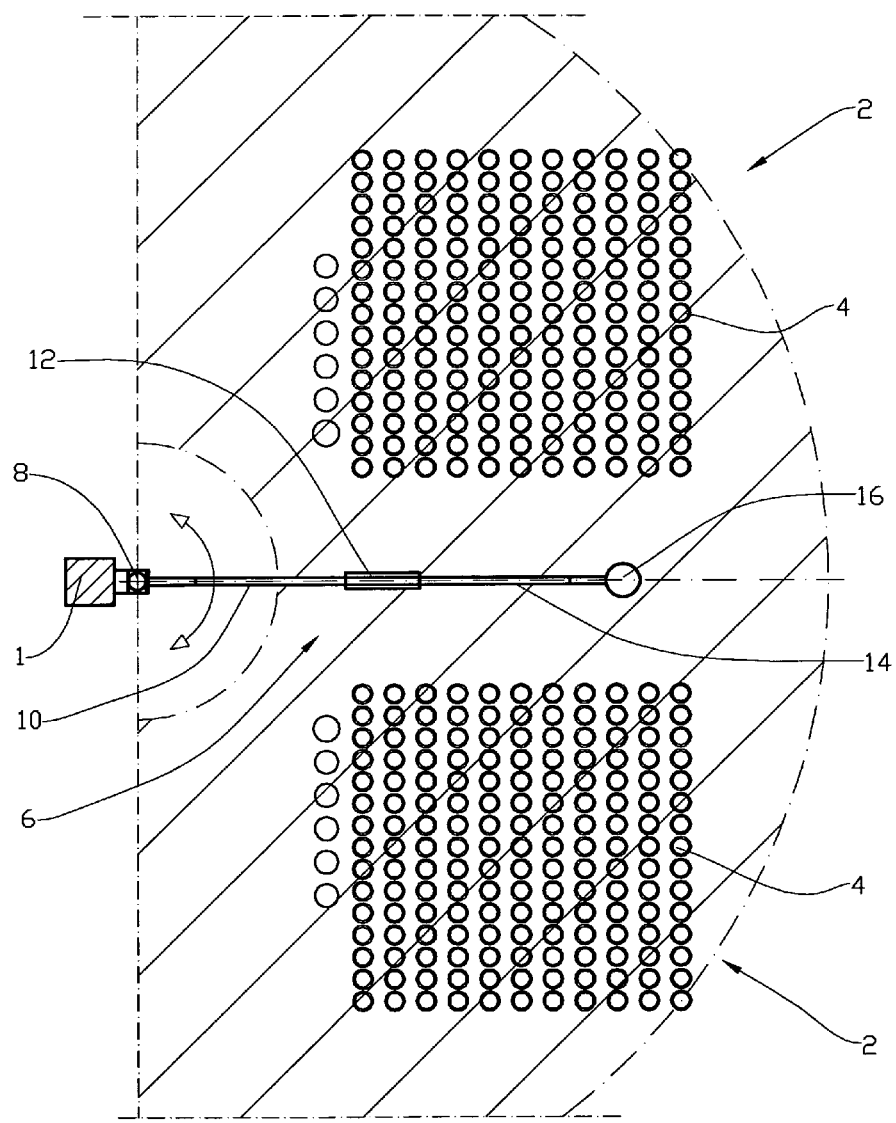
FIG. 2 shows a plan view of the device of FIG. 1.
Figure 3:
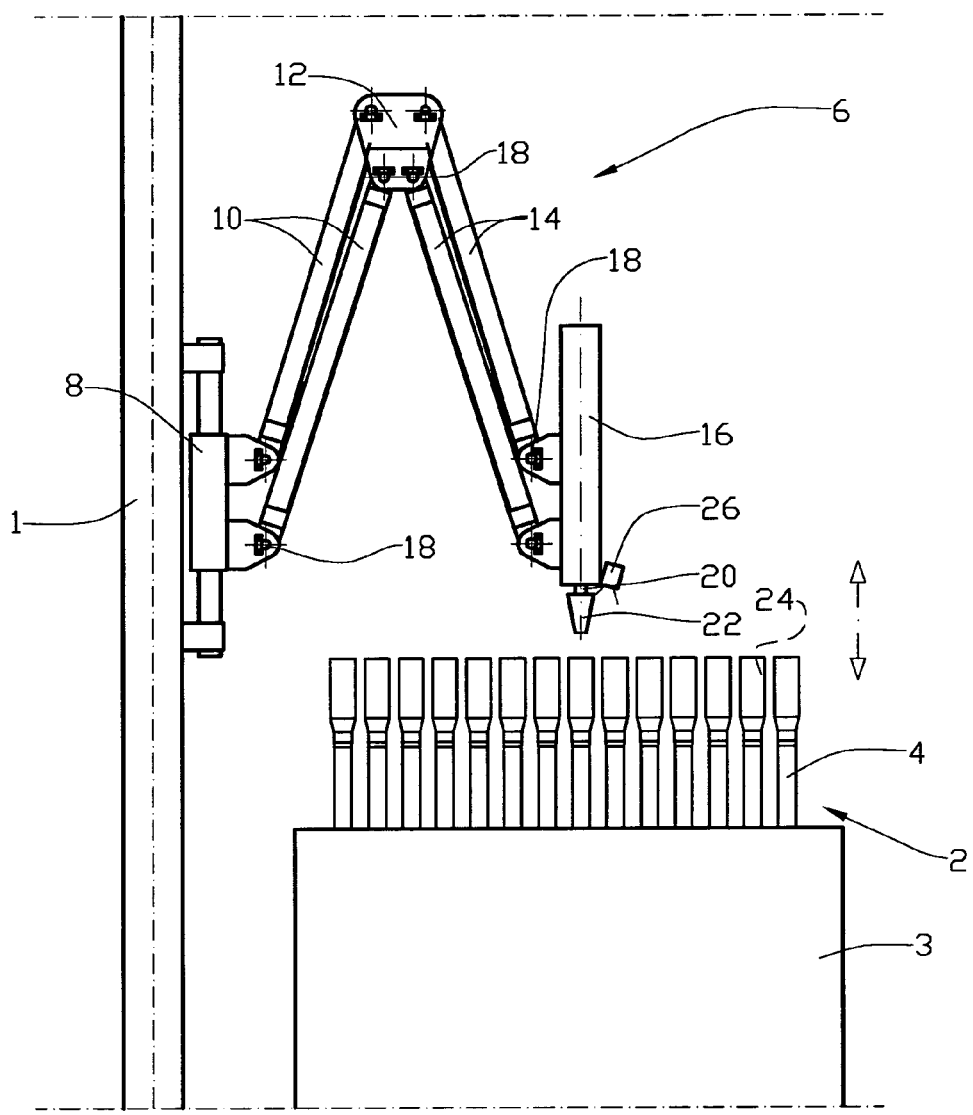
FIG. 3 shows the device of FIG. 1, but in a displaced position.

In the drawings, the reference numeral 1 indicates a derrick with a set-back 2 for pipe string sections 4. The supporting structure 3 of the set-back 2 is of a design known per se.

A manipulator 6 is rotatably and height-displaceably connected to the derrick 1 by means of an electrically or hydraulically activatable swivel guide 8. From the swivel guide 8, two first parallel-motion arms 10 extend to a connecting link 12. Two other parallel-motion arms 14 extend from the connecting link 12 to an elevation guide 16.

The first and second parallel-motion arms 10, 14 are rotatable in a vertical plane around their respective supporting bolts 18 in, respectively, the swivel guide 8, the connecting link 12 and in the elevation guide 16. The components 8, 10, 12, 14 of the manipulator 6, which are electrically or hydraulically operated, are arranged to hold the elevation guide 16 in a vertical position as it is moved in and out relative to the swivel guide 8.

The elevation guide 16 includes a hydraulic vertically movable tool holder 20 which is provided with a cleaning and lubricating tool 22, hereinafter called tool, of a design known per se for treating the threaded portions 24 of the pipe string sections.

The manipulator 6 is arranged to controlledly rotate around the swivel guide 8. Additionally, the manipulator 6 is arranged to be displaced heightwise in the swivel guide 8 to coarsely adjust the height level of the manipulator 6 relative, to the length of the pipe string sections 4.

A camera 26 is placed on the elevation guide 16 and directed towards the tool 22 and the threaded portions 24.

When one or more threaded portions 24 of the pipe string sections 4 are to be treated, the tool 22 is carried automatically or manually by means of the manipulator 6 to a position at the first of the threaded portions 24 that are to be treated. A picture from the camera 26 is shown on a screen, not shown, whereby an operator, not shown, can position the tool 22 approximately concentrically above the threaded portion 24.

The tool 22 is then moved into the threaded portion 24, after which cleaning and lubricating is carried out in a manner known per se. By measuring how far down the tool 22 is moved before it is in its active position in the threaded portion 24, the length of the relevant tool string section from a pipe end support, not shown, may be determined.

Then the tool 22 is moved out of the threaded portion 24 and positioned above the next threaded portion 24 that is to be treated.

Figure 4:
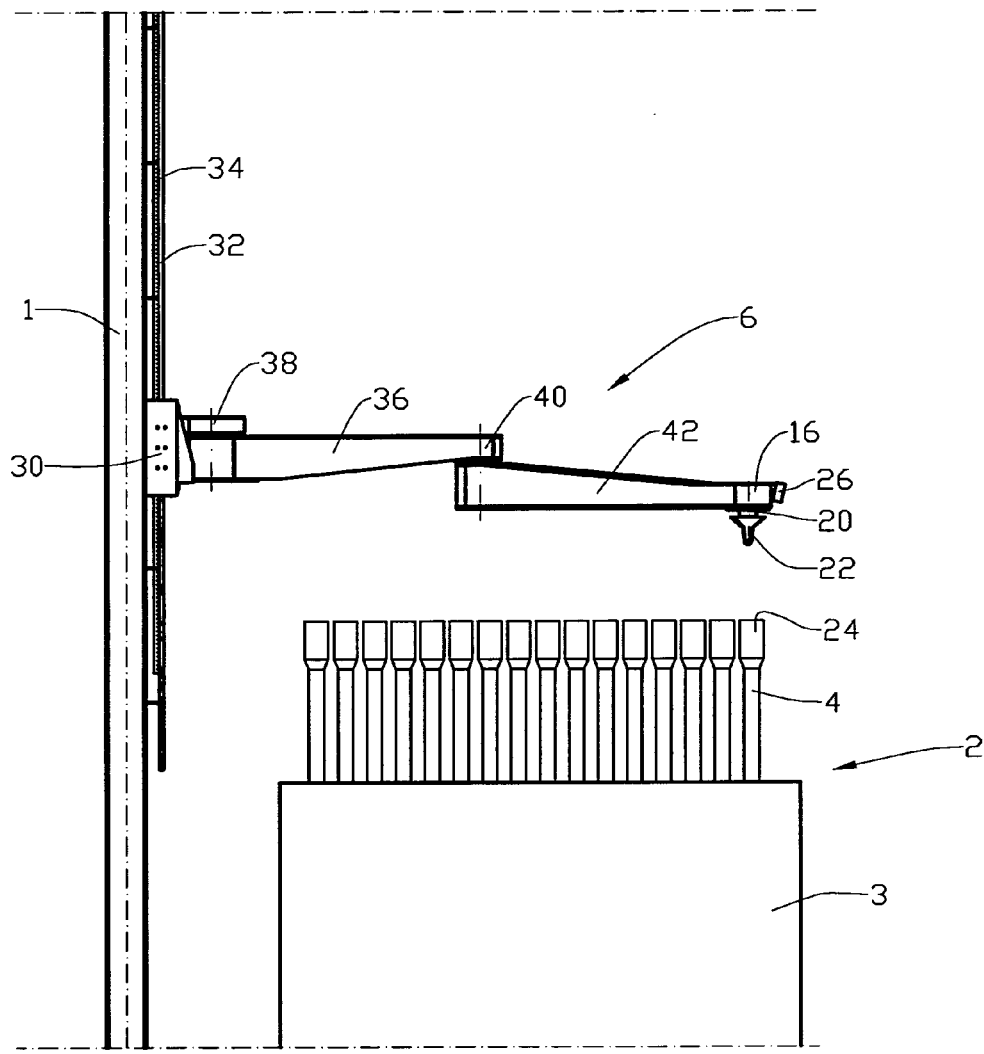
FIG. 4 shows a side view of the device according to the invention in an alternative embodiment.
Figure 5:
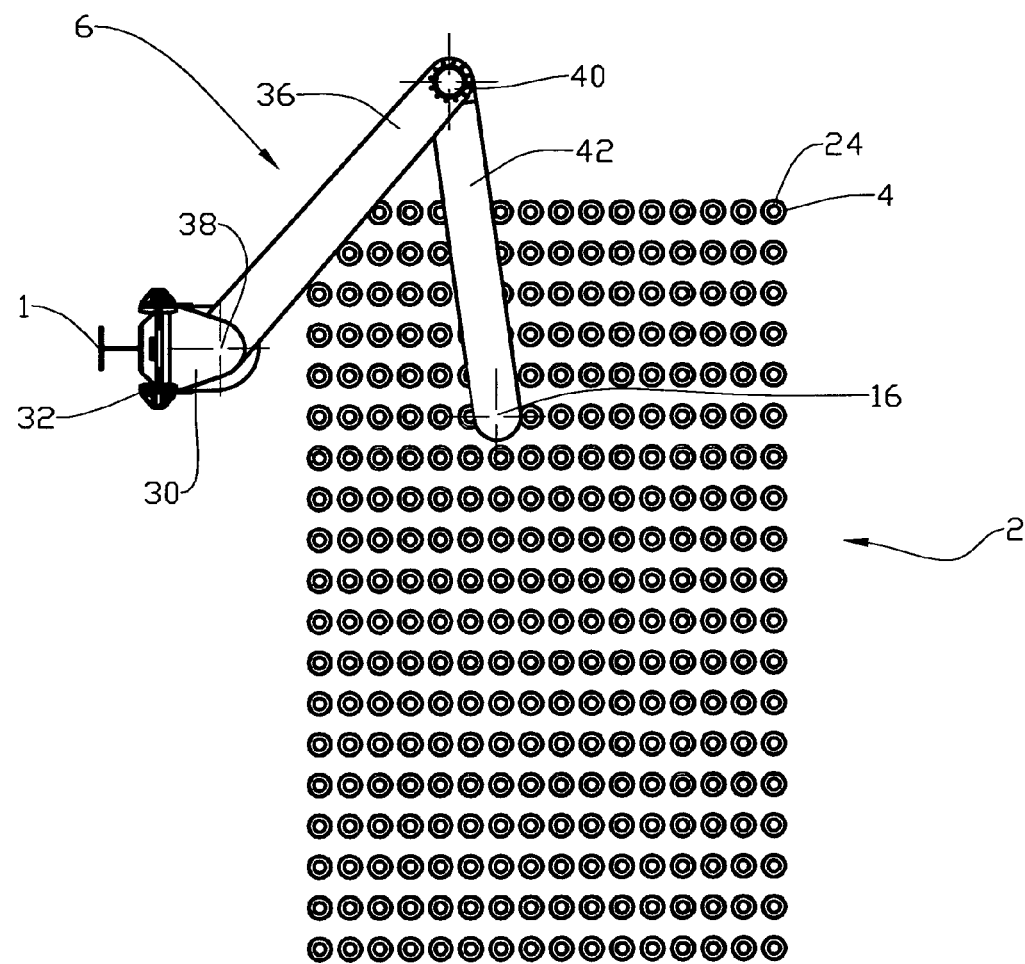
FIG. 5 shows a plan view of the device of FIG. 4.

In an alternative embodiment, see FIGS. 4 and 5, the manipulator 6 includes a guide 30 which is vertically movable on a rail 32 by means of an electrically or hydraulically operated gear, not shown, which is in engagement with a pitch rack 34. The rail 32 and the pitch rack 34 are fixed to the derrick 1.

A first pivotal arm 36 extends approximately horizontally between a first pivot joint on the guide 30 and a second pivot joint 40 at its opposite end portion.

A second pivotal arm 42 extends approximately horizontally from the second pivot joint 40 and is provided, at its opposite end portion, with an elevation guide 16 for a tool holder 20. The tool holder 20 is provided with a cleaning and lubricating tool. A camera 26 is connected to the elevation guide 16.

The first pivot joint 36, the second pivot joint 38 and the elevation guide 16 are remote-controllable by means of electric or hydraulic actuators, not shown.

Thereby, in a manner corresponding to that described above, the cleaning and lubricating tool 24 may be positioned at a desired threaded portion 24 to clean and lubricate the threaded portion 24.

The invention claimed is:

1. A set-back for pipe string sections, comprising:
    a plurality of pipe string sections that are vertically oriented and laterally spaced within the set-back at a location that is spaced and separate from a well center, wherein each of the pipe string sections has a threaded portion at an upper end of the pipe string section; and
    a tool configured to clean or lubricate the threaded portion of each of the pipe string sections while the pipe string sections are disposed within the set-back;
    wherein the tool is connected to a remote-controllable manipulator configured to position the tool at each of the threaded portions of the pipe string sections while the pipe string sections are disposed within the set-back; and
    wherein the manipulator includes:
        a guide configured to move along on a rail mounted to a derrick; and
        a plurality of pivoting arms, wherein each pivoting arm is pivotally coupled to another of the pivoting arms at one end and is pivotally coupled to one of the guide and the tool at an opposite end.

2. The set-back in accordance with claim 1, wherein the manipulator has a working range covering the entire set-back.

3. The set-back in accordance with claim 1, wherein the pivoting arms of the manipulator are hydraulically movable.

4. The set-back in accordance with claim 1, wherein the pivoting arms of the manipulator are electrically movable.

5. The set-back in accordance with claim 1, wherein the manipulator is configured to cooperate with a position indication system which is arranged to show the position of the tool on a display.

6. The set-back in accordance with claim 1, wherein the plurality of pipe string sections are arranged in a plurality rows within the set-back.

7. The set-back of claim 1,
    wherein the manipulator further comprises a pitch rack mounted to the derrick; and
    wherein the guide is coupled to the pitch rack to facilitate movement of the guide along the rail.

8. A set-back for pipe string sections, comprising:
    a plurality of pipe string sections that are vertically oriented and laterally spaced within the set-back, wherein each of the pipe string sections has a threaded portion; and
    a tool configured to clean or lubricate the threaded portion of each of the pipe string sections while the pipe string sections are disposed within the set-back;
    wherein the tool is connected to a remote-controllable manipulator configured to position the tool at each of the threaded portions of the pipe string sections while the pipe string sections are disposed within the set-back; and
    wherein the manipulator includes:
        a swivel guide mounted to a derrick; and
        a plurality of pivoting arms, wherein each pivoting arm is pivotally coupled to another of the pivoting arms at one end and is coupled to one of the swivel guide and the tool at an opposite end;
        wherein the plurality of pivoting arms is configured to rotate relative to the derrick about the swivel guide.

9. The set-back in accordance with claim 8, wherein the manipulator has a working range covering the entire set-back.

10. The set-back in accordance with claim 8, wherein the manipulator is configured to cooperate with a position indication system which is arranged to show the position of the tool on a display.

* * * * *